T. M. MURPHY.
STREET WASHING MACHINE.
APPLICATION FILED OCT. 7, 1905.
900,870.
Patented Oct. 13, 1908.
5 SHEETS—SHEET 1.
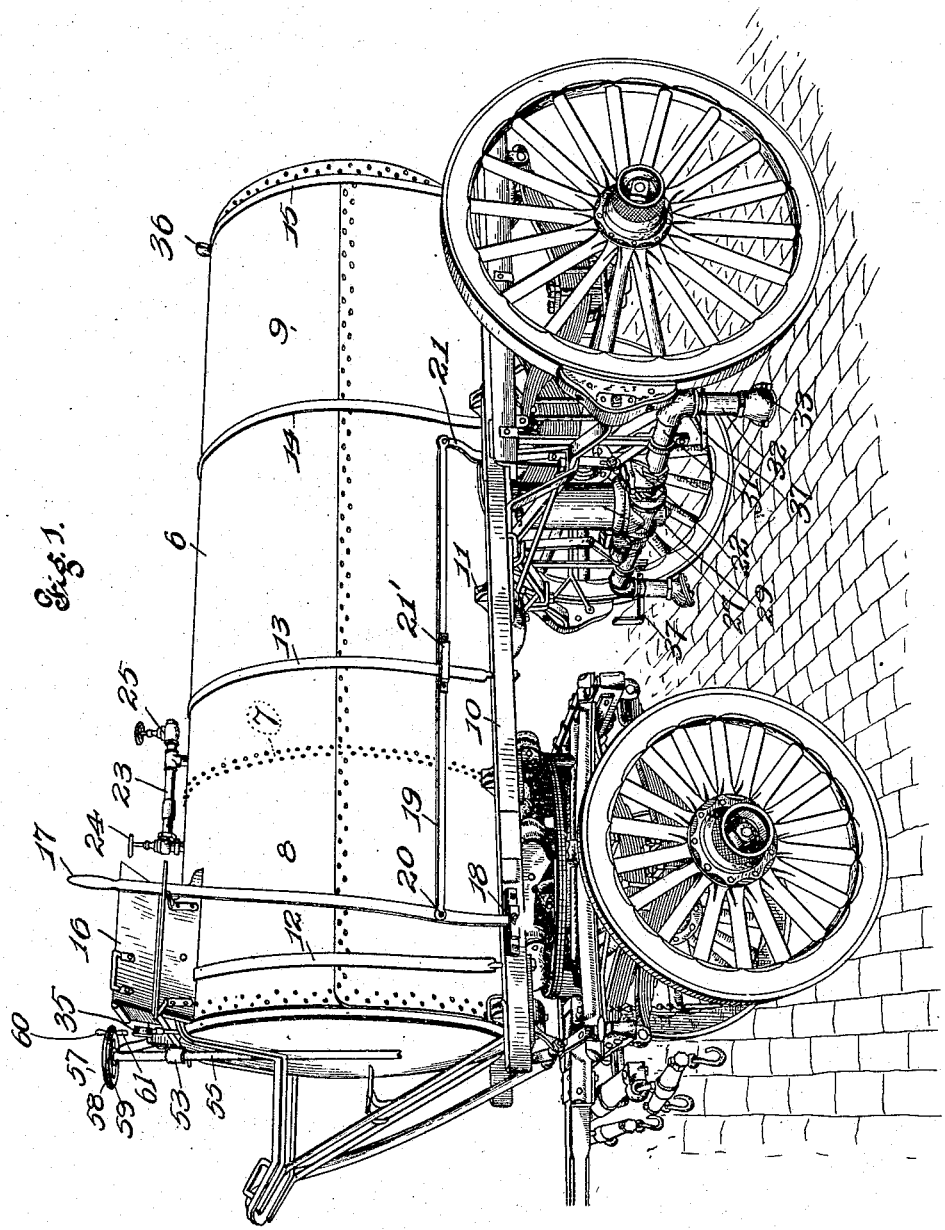
Witnesses
W. C. Stein.
L. A. L. McIntyre
Inventor
Thomas Michael Murphy
By Hopkins & Eads Attys.

T. M. MURPHY.
STREET WASHING MACHINE.
APPLICATION FILED OCT. 7, 1905.
900,870.
Patented Oct. 13, 1908.
5 SHEETS—SHEET 2.
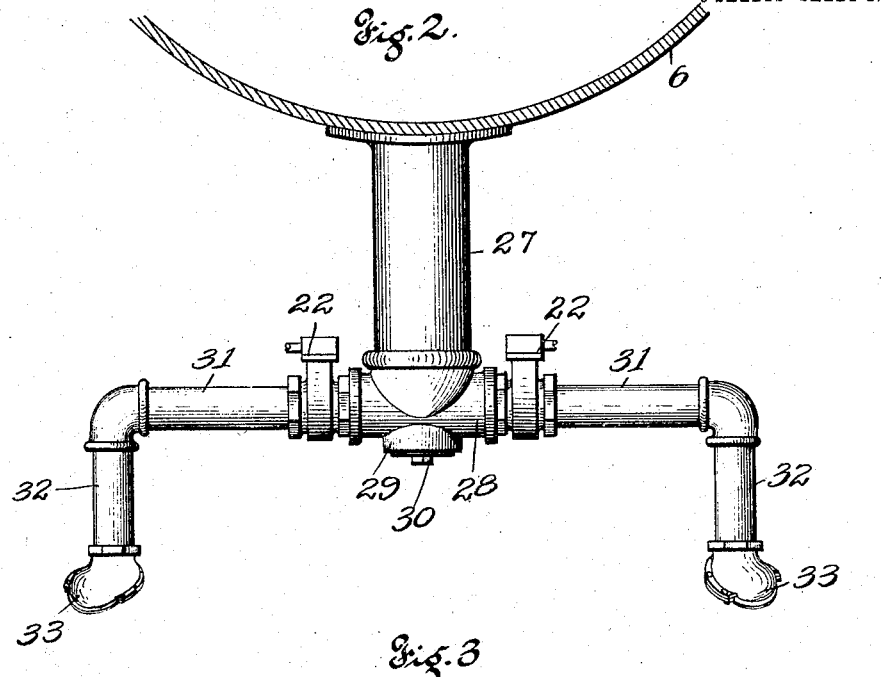
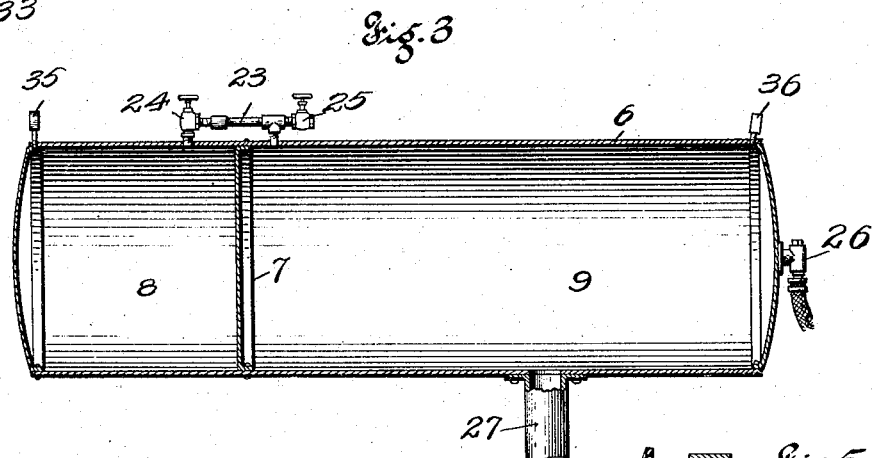
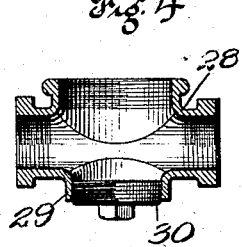
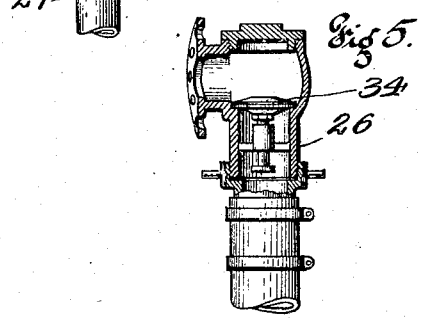
Witnesses
W. C. Stein.
L. A. L. McIntyre.
Inventor
Thomas Michael Murphy
By Hopkins & Eicks Attys

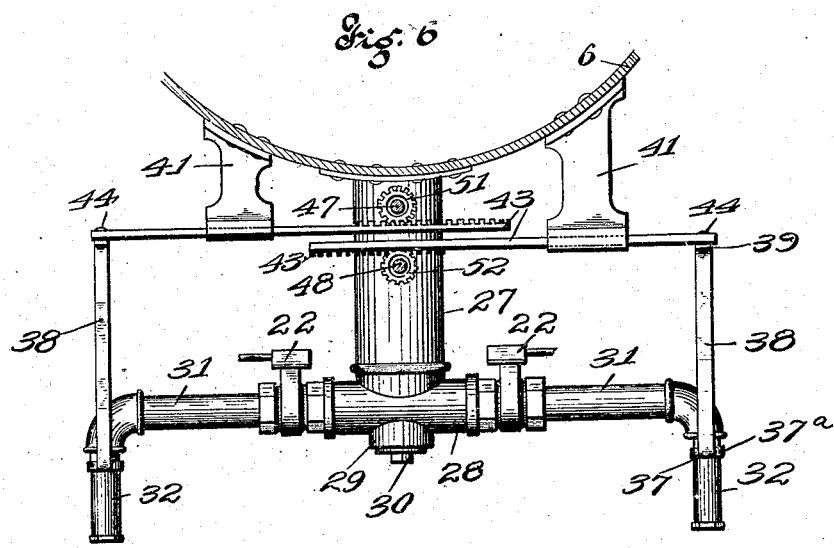

T. M. MURPHY.
STREET WASHING MACHINE.
APPLICATION FILED OCT. 7, 1905.
900,870.
Patented Oct. 13, 1908.
5 SHEETS—SHEET 4.
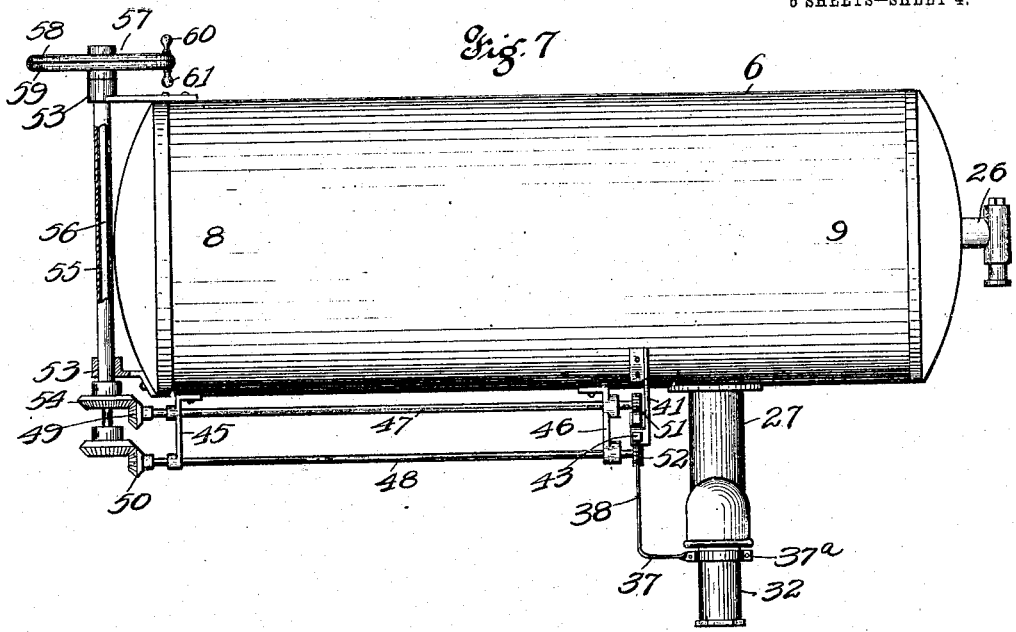
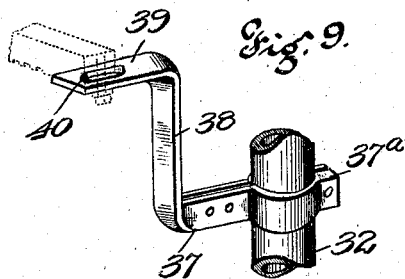
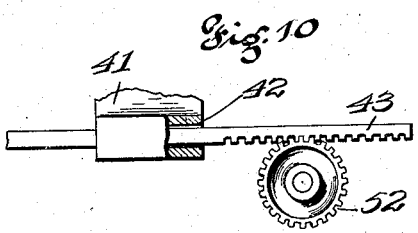
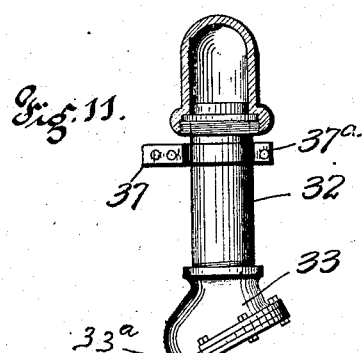
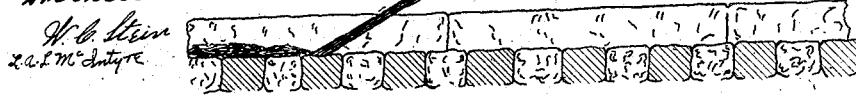

T. M. MURPHY.
STREET WASHING MACHINE.
APPLICATION FILED OCT. 7, 1905.
900,870.
Patented Oct. 13, 1908.
5 SHEETS—SHEET 5.
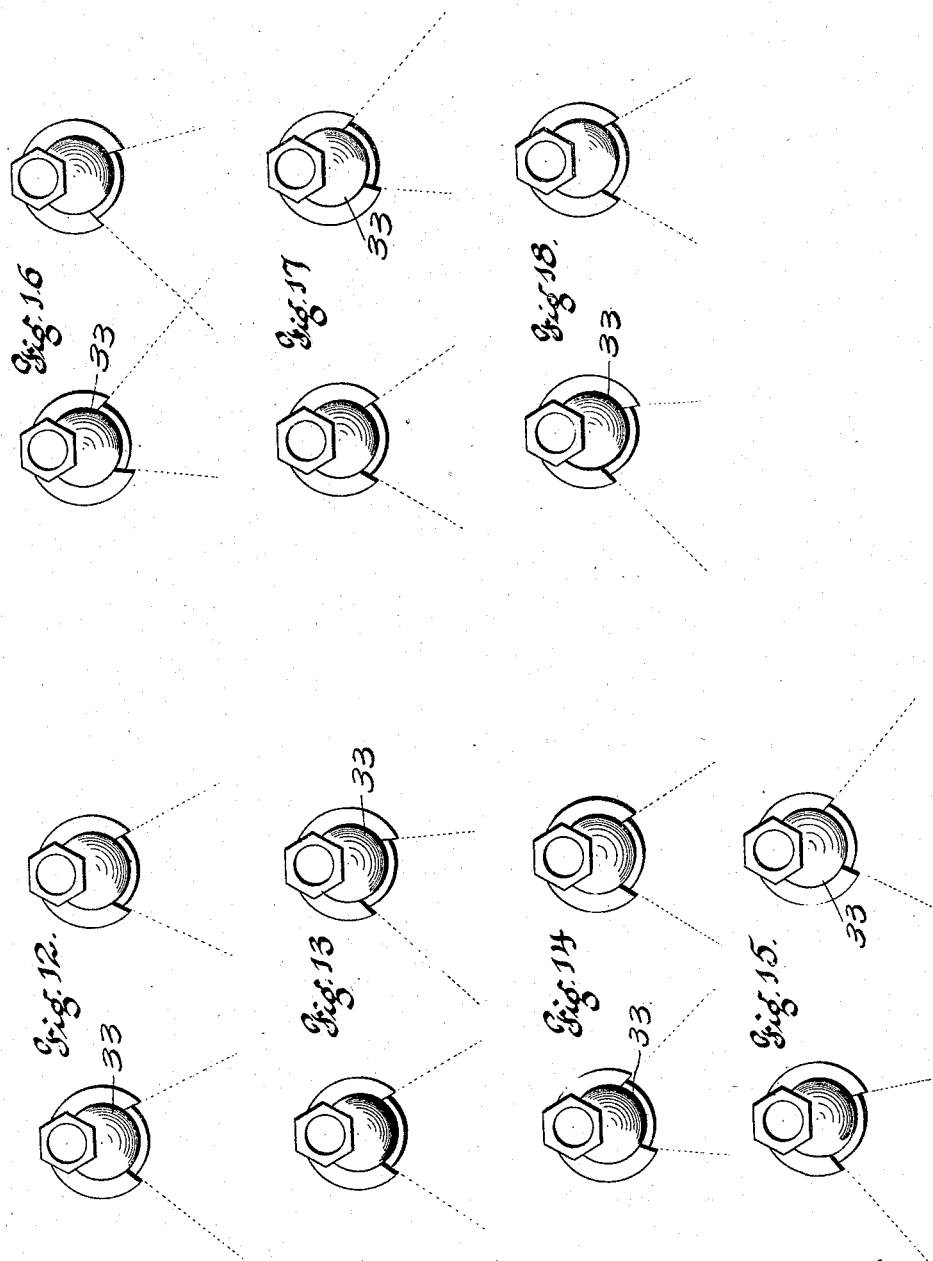

UNITED STATES PATENT OFFICE.

THOMAS MICHAEL MURPHY, OF ST. LOUIS, MISSOURI, ASSIGNOR TO SANITARY STREET CLEANSING & SPRINKLING MACHINE COMPANY, OF ST. LOUIS, MISSOURI, A CORPORATION OF MISSOURI.

STREET-WASHING MACHINE.

No. 900,870.

Specification of Letters Patent.  Patented Oct. 13, 1908.

Application filed October 7, 1905. Serial No. 281,863.

*To all whom it may concern:*

Be it known that I, THOMAS MICHAEL MURPHY, a citizen of the United States, and resident of St. Louis, Missouri, have invented certain new and useful Improvements in Street-Washing Machines, of which the following is a specification.

My invention relates to improvements in street washing machines, and has for its object to provide, in a street washing machine adapted to forcibly discharge liquids for the purpose of street cleaning, means for accurately regulating the pressure of the fluid and means for directing the discharge to the front, sides or rear of the machine, to the end that it may be used for flushing or sprinkling purposes, as desired.

In the drawings: Figure 1 is a perspective view of a street washing machine embodying my invention. Fig. 2 is a front view of the discharge nozzles and their connections. Fig. 3 is a transverse vertical view in mid-section of the tank employed in my invention. Fig. 4 is a transverse vertical view in mid-section of the sediment trap employed in my invention. Fig. 5 is a transverse vertical view in mid-section showing the valve through which the supply of cleansing fluid is admitted to the machine. Fig. 6 is an enlarged detail view of the means for controlling the position of the discharge nozzles. Fig. 7 is a longitudinal vertical view of the machine of my invention showing the details of the mechanism for controlling the position of the nozzles. Fig. 8 is an enlarged detail view of the bevel-gear mechanism showing the hand-wheel in section. Fig. 9 is an enlarged view of one of the tubes carrying the flushing-heads, and the radially projecting arm by which it is actuated. Fig. 10 is an enlarged detail view of a portion of the rack and pinion mechanism. Fig. 11 is a vertical side view of one of the flushing-heads and its connections. Figs. 12 to 18 inclusive, are diagrammatic views showing the relative positions of the flushing-head attained in the use of my invention.

As shown in the drawings, I employ a cylindrical tank 6 which is divided by the bulk head 7 into an air chamber 8, and a water chamber 9. Upon a suitable running gear, longitudinal sills 10 are mounted. Transverse bearers 11 are mounted upon the sills 10, and the tank 6 is supported by said bearers. The tank 6 is held in place upon the bearers 11 and sills 10 by means of the straps 12, 13, 14, and 15.

Upon the forward end of the tank 6, I provide the seat 16; at each side of the seat 16 I provide a hand lever 17 which is fulcrumed to the sills 10 at a point indicated by the numeral 18. An arm 19 is pivotally mounted to the hand lever 17 at the point indicated by the numeral 20, and at a point approximately mid-way its length, the bar 19 is slidably mounted upon the strap 13 by means of the guide member 21'. At its rear end the bar 19 is pivotally connected to the lever 21 by which the valves 22 are actuated. The water chamber 9 is connected to the air chamber 8 by means of the tubular connection 23 in which are seated valves 24 and 25. Water or other cleansing fluid is admitted to the water chamber 9 through the valve 26 from any suitable source of supply, and the air compressed within the water chamber 9 is forced through the tubular connection 23 into the air chamber 8. The water chamber 9 is provided with the depending tubular member 27, to the lower end of which is affixed the T-joint 28, the lower portion of which is enlarged as indicated by the numeral 29 to form a sediment chamber, and the bottom of the sediment chamber 29 is provided with a tap 30 whereby the sediment chamber may be readily opened for the purpose of cleaning it. The T-joint 28 is provided at each end with the tubes 31 in which the valves 22 are seated. The tubes 31 at their outer ends are connected to the depending tubes 32, and at the bottom of the tubes 32 I provide the flushing-heads 33, which are rigidly mounted upon the tubes 32, and are adapted to discharge the cleansing fluid upon the surface to be cleansed at a sharp angle of from 20° to 45°.

The compressed air which is accumulated within the air chamber 8, during the process of filling the water chamber 9 with fluid, is utilized to forcibly discharge the fluid from the tank 9 through the tube 27 and nozzles 33, and this discharge is effected at either side of the machine or upon both sides simultaneously at the will of the operator; such discharge being controlled by means of the hand levers 17. The flow of fluid into the water chamber 9 is controlled by the check-valve 34 seated in the tube 26.

The machine is provided with an air gage 110

35 conveniently mounted near the seat of the driver, and a water gage 36 facing toward the rear of the machine. The structure thus described may be propelled in any suitable manner upon the streets to be cleaned.

By means of the mechanism which I have illustrated and described, I have provided perfect means of control of the discharge at each side of the machine, and by utilizing the strap 13 as a guide and brace for the bars 19, I have secured strength and rigidity for the portion of my apparatus which is intended to accomplish this result.

In accommodating the discharge from the machine to varying widths of thoroughfares or other surfaces to be cleansed, I have found it desirable to control the relative positions of the discharge nozzles to each other. Under varying conditions it is expedient to revolve the discharge nozzles laterally toward each other in order to concentrate the streams of both nozzles upon the same path, or to cause them to diverge to a greater or less angle according to the nature of the surface to be cleansed. It is obvious that to accomplish these results, each nozzle should be subject to individual control by the operator, and that they should be capable of being simultaneously moved in the same direction. To accomplish these results, the tubes 32 carrying the flushing heads 33 are revolubly mounted at their upper ends to the outer extremities of the tubes 31. Each of the tubes 32 is provided with a radially projecting arm 37 secured to the outer surface of the tubes 32 by means of the collar 37ª. The outer ends of the arms 37 are turned upwardly and then outwardly, in goose-neck form as indicated in Fig. 9; the vertical portion of the bar being indicated by the numeral 38, and the upper horizontal member being indicated by the numeral 39. The upper horizontal member 39 is provided with a longitudinal slot 40.

It is obvious that the arm 37 may be of any desired form or curvature; the form illustrated in the drawings is necessary on account of the location of the other portions of the mechanism of my invention, and is preferred because of the necessity of bringing the points of the arms 37 upon which the pull is exerted by the steering mechanism, above the level of the front truck upon which the machine is supported and by which it is carried. The hangers 41 are mounted upon the bottom of the tank 6, one at each side of the machine. The hangers 41 are provided with the horizontal openings 42 in which the rack-bars 43 are slidably mounted. The rack-bars 43 are secured at their outer ends to the upper horizontal portion 39 of the arms 37 by bolts 44 rigidly mounted in the rack-bars 43 and extending through the slots 40. On the median line of the bottom of the tank 6, I have provided other depending hangers 45 and 46 in which the pinion-rods 47 and 48 are journaled. These pinion rods are provided at their front ends with the bevel-gears 49 and 50, respectively, and at their rear extremities with the pinions 51 and 52, respectively. At the front of the tank 6 I have provided bearings 53 within which the sleeve-axle 55 is mounted, said sleeve-axle carrying the bevel-gear 54 by which the pinion-rod 47 is actuated through the bevel-gear 49; within the sleeve-axle 55 the axial shaft 56 is mounted. Upon the tops of the sleeve-axle 55 and the axial shaft 56 I have provided a hand-wheel 57 which is made in two sections 58 and 59; the section 58 being rigidly secured to the extremity of the shaft 56, while the section 59 is rigidly secured to the upper end of the sleeve-axle 55. Sections 58 and 59 are provided with the handles 60 and 61 respectively, so that the operator can revolve both sections 58 and 59 simultaneously or independently in either direction thus moving the nozzles 33 laterally and in the same or opposite directions. By the means described either of the nozzles may be moved laterally independently of the other, or both may be moved simultaneously. I am thus enabled to move the nozzles 33 toward each other laterally so as to concentrate the streams emitted by both upon a single narrow swath beneath the machine; or by causing them to diverge, I am enabled to make a wide swath. All of these movements of the nozzles are readily accomplished by the driver without moving from his seat.

Another object attained by my invention is that by means of the described mechanism for revolving the nozzles, it is possible to convert the street washing machine into a street sprinkler. In the normal use of the machine, as in all machines of the class which is adapted to discharge a cleansing fluid under supernormal pressure upon the surface to be cleansed, the discharge is forward and in the direction of travel of the machine. For street sprinkling purposes, the discharge is either at rightangles to the path of the machine, or rearwardly.

When it is desired to have the discharge effected at the side of the machine or towards the rear, it is merely necessary to loosen the collar 37ª from its contact with the outer surface of the depending tube 32, and then turn the tube 32 to bring the discharge orifice of the flushing-head 33 to the desired position. After this change of position of the flushing-head 33 is effected, the collar 37ª is then tightened about the tube 32 and the machine is then capable of use as a street sprinkler.

The flushing-head 33 being provided as shown in the drawings with a narrow, transverse delivery mouth 33ª set at such an angle as to most efficiently remove the dirt from the street by washing it forwardly and laterally, when the air pressure employed is sufficient to expel the water forcibly from the flushing-head, in a substantially flat solid stream as shown in Fig. 11, it is obvious that when the air pressure is not employed, the force of the stream will be diminished and the water will be ejected merely by its own weight. This change of function can obviously be accomplished without altering the angle at which the water is discharged from the flushing-head with reference to the line of travel of the machine; but preferably when the machine is used as a sprinkler a rearward discharge is desired and can be effected by means of the revolving mechanism hereinbefore described.

In addition to the functions incident to the device of my invention which I have heretofore described, it is obvious that it is at times necessary to employ considerable force in removing dirt from the street surface when that dirt consists of oily or other heavy material which is unusually difficult to remove. By the mechanism described that result is attained by concentering both streams upon the mass to be removed in the manner indicated in Fig. 16; and this is accomplished by a front or rear discharge as desired. When the material is so adhesive to the street surface as to require a continued exertion of the force of the stream from the washing machine the streams may be converged as indicated in Fig. 16, and toward the rear of the machine. The machine may then be brought to a stop and the streams thus converged employed upon the material to be removed continuously for so long a time as is necessary to accomplish the cleansing of the street surface from the material. In accomplishing this cleansing, the mechanism of my invention permits the adjustment of the discharge to an angle which will best serve to convey the removed material to the desired point of deposit. Thus, if the material is in the vicinity of a sewer opening that angle will be secured which will drive the material directly toward such sewer opening, otherwise the material will be driven either to the adjacent street gutter or when the machines of my invention are employed in gangs as is the practice in the art, the material will be discharged so as to fall in the path of the next accompanying machine. When so used in gangs the machines are driven in parallel paths and the discharge accordingly will be effected toward the right or left and rear of the machine so as to fall within the path of the machine next following it.

By reason of the adjustability of the angle of discharge of the flushing or sprinkling stream, and as that adjustability may be accomplished by the independent or contemporaneous revolution of the flushing-head the device of my invention embodies all of the advantages of the street flushing machines as well as of the street sprinkling machines now commonly in use; and for the first time in the art these advantages are all embodied in a single machine.

When it is desired to use the machine merely as a street sprinkler, the water chamber 9 is charged with water in the usual manner, but the valve 25 is left open during the operation of filling the water chamber 9 and it is left open during the operation of discharge.

Having fully described my invention, what I claim and desire to have secured to me by Letters Patent, is:

1. In a street washing machine a suitable running gear, a tank adapted to contain water under pressure, two oppositely disposed depending revoluble tubes extending from the interior of said tank, nozzles mounted on said tubes, means whereby said tubes may be revolved simultaneously or independently, an air tank, a valve-controlled connection between said tank and the first named tank, whereby the contents of the water tank may be discharged under pressure from the air tank when it is desired to use the machine as a flushing machine, substantially as specified.

2. In a traveling street washing machine, the combination of a tank adapted to contain water under pressure, a plurality of nozzles connected to said tank, and revolubly mounted upon opposite sides of the tank, said nozzles being adapted to discharge cleansing fluid at a sharp angle upon the surface to be cleansed, and be revoluble in a horizontal plane; and a rack and pinion mechanism whereby the nozzles on each side of the machine may be revolved in such horizontal plane simultaneously or independently, and an air tank having a valve-controlled connection with the first named tank and adapted to deliver air under pressure to the first named tank when it is desired to use the machine as a flushing machine, substantially as specified.

In testimony whereof, I have signed my name to this specification, in presence of two subscribing witnesses.

THOMAS MICHAEL MURPHY.

Witnesses:
ALFRED A. EICKS,
GEO. P. BURLEIGH.